United States Patent
Åstrand et al.

(10) Patent No.: US 9,076,269 B2
(45) Date of Patent: Jul. 7, 2015

(54) METHOD AND ELECTRONIC DEVICE FOR CREATING A COMBINED IMAGE

(75) Inventors: Per Åstrand, Lund (SE); Magnus Landqvist, Lund (SE); Karl Ola Thörn, Limhamn (SE); Mats Wernersson, Helsingborg (SE); Linus Mårtensson, Löddeköpinge (SE); Henrik Bengtsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/813,187

(22) PCT Filed: Jan. 31, 2012

(86) PCT No.: PCT/EP2012/051571
§ 371 (c)(1),
(2), (4) Date: Feb. 28, 2013

(87) PCT Pub. No.: WO2013/113373
PCT Pub. Date: Aug. 8, 2013

(65) Prior Publication Data
US 2014/0219581 A1    Aug. 7, 2014

(51) Int. Cl.
*G06K 9/36* (2006.01)
*G06T 11/60* (2006.01)
(Continued)

(52) U.S. Cl.
CPC .............. *G06T 11/60* (2013.01); *G06T 3/4038* (2013.01); *G06T 2207/10021* (2013.01); *G06T 2207/20228* (2013.01); *G06T 5/50* (2013.01); *G06T 2207/20221* (2013.01)

(58) Field of Classification Search
CPC . G06T 11/00; G06T 5/50; G06T 2207/20221; G06T 2207/20212
USPC ......... 382/107, 154, 164, 167, 173, 254, 284; 356/4.04
See application file for complete search history.

(56) References Cited

U.S. PATENT DOCUMENTS 6,487,304 B1 * 11/2002 Szeliski ................ 382/107
8,131,062 B2 * 3/2012 Jupe ..................... 382/154
(Continued)

FOREIGN PATENT DOCUMENTS

EP          2385705       11/2011

OTHER PUBLICATIONS

International Search Report and Written Opinion dated Oct. 26, 2012 issued in corresponding PCT application No. PCT/EP2012/051571, 13 pages.
(Continued)

*Primary Examiner* — Amir Alavi
(74) *Attorney, Agent, or Firm* — Snyder, Clark, Lesch & Chung, LLP

(57) ABSTRACT

An object of the present invention is to provide a way of improving the stitching procedure.
The object is achieved by a method in an electronic device for creating a combined image. The method comprises obtaining (701) a first set of at least two sub-images recorded by an array camera. The method further comprises obtaining (702) a second set of at least two sub-images recorded by the array camera. A first depth map is calculated for the first set of sub-images. The first depth map comprises information about a first plane of the sub-images and a second plane of the sub-images. The first plane being at a first distance from the point where the sub-images have been recorded, and the second plane being at a second distance from the point where the sub-images have been recorded. A second depth map is calculated for the second set of sub-images. The second depth map comprises information about the first plane and the second plane. The method further comprises stitching the first set of sub-images and the second set of sub-images in the first plane, and thereby obtaining a first stitched image. The first set of sub-images and the second set of sub-images are stitched in the second plane, and thereby obtaining a second stitched image. Finally the method comprises combining the first stitched image with the second stitched image and thereby creating the combined image.

15 Claims, 5 Drawing Sheets

(51) Int. Cl.
*G06T 3/40* (2006.01)
*G06T 5/50* (2006.01)

(56) References Cited

U.S. PATENT DOCUMENTS

| | | | |
|---|---|---|---|
| 8,411,934 B2 * | 4/2013 | Zhang et al. | 382/154 |
| 2012/0069320 A1 * | 3/2012 | Simonov et al. | 356/4.04 |
| 2013/0101263 A1 * | 4/2013 | Morioka et al. | 386/224 |
| 2013/0156294 A1 * | 6/2013 | Wei | 382/154 |
| 2014/0219581 A1 * | 8/2014 | Astrand et al. | 382/284 |

OTHER PUBLICATIONS

Soon-Young Lee; Panoramic Scene Generation Form Multi-View Images with Close Foreground Objects; 28th Picture Coding Symposium; Dec. 8-10, 2010; Nagoya, Japan, pp. 486-489.

* cited by examiner

METHOD AND ELECTRONIC DEVICE FOR CREATING A COMBINED IMAGE

This application is a 371 of PCT/EP2012/051571 Jan. 31, 2012.

TECHNICAL FIELD

Embodiments herein relate an electronic device and a method therein. Embodiments herein relate generally to image processing and in particular embodiments herein relate to creating a combined image of at least two sub-images.

BACKGROUND

In photography it is not possible to take panoramic images with all cameras. To take a panoramic image usually requires a wide angle lens. One way of creating a panoramic image from a series of images is by a method called stitching. The individual images are captured with some overlap to allow proper registration. The images are preferably taken from the same location.

Proper registration may include transforms for correction of optical distortions as well as improper leveling induced by the user operating a hand held camera. While those corrections are commonly handled in stitching software there is another problem that cannot be corrected easily.

If the images are not taken from exactly the same location and if there is both a foreground and a background in the image, a new problem may occur. Even if it is possible to stitch the images in respect to the background, the foreground from the two images may not line up correctly. This problem is called internal parallax. This problem will be described in more detail below.

FIG. 1 illustrates a lens 100 comprised in a camera with a first nodal plane 101, an axis 102 and a focal plane 103. The first nodal plane 101 intersects the axis 102 at a first principal point 104. Two objects, object A 105 and object B 106, are placed at different distances from the lens 100. The objects are pictured at the focal plane 103. FIG. 2 illustrates the resulting image at the focal plane 103. Object A 105 can be seen behind object B 106.

In FIG. 3 the camera, and consequently the lens 100, is turned around the first principal point 104. The two objects 105, 106 are still situated on a straight line 300 that is passing through the first principal point 104. The image of the two objects 105, 106 at the focal plane 103 will look just the same as for the arrangement of FIG. 2 except that the objects will now appear closer to the edge of the image while they appeared in the center in the example described with relation to FIG. 1.

In FIG. 4 the camera is now turned around a point p 400 as opposed to the first principal point 104 in FIG. 1. Note that the two objects 105,106 are not aligned on the same line crossing the first nodal point 104. The two lines $C_1$ 401 and $C_2$ 402 that mark the centers of the objects now hit the focal plane 103 with a slight separation. In the image at the focal plane 103 object b 106 that is closer to the camera will not line up with object a 105 that is further away from the camera. This is illustrated in FIG. 5.

From the description in relation to FIGS. 1 to 5 it can be understood that we can only produce a perfectly stitched image if the camera was rotated around the first principal point 104 of the lens 100. This is of course impossible to do when holding the camera by hand. Even when the camera is mounted on a tripod it must be precisely aligned and calibrated.

SUMMARY

It is therefore an object of embodiments herein to provide a way of improving the stitching procedure.

In accordance with a first aspect of an embodiment, a method in an electronic device for creating a combined image is provided. The method comprises obtaining a first set of at least two sub-images recorded by an array of image recording units. The array of recording units may e.g. be an array camera. The method further obtains a second set of at least two sub-images recorded by the array of image recording units. A first depth map is calculated for the first set of sub-images, the first depth map comprises information about a first plane of the sub-images and a second plane of the sub-images, the first plane being at a first distance from the point where the sub-images have been recorded, and the second plane being at a second distance from the point where the sub-images have been recorded. A second depth map is calculated for the second set of sub-images, the second depth map comprises information about the first plane and the second plane. The method further comprises stitching the first set of sub-images and the second set of sub-images in the first plane, and thereby obtaining a first stitched image. The first set of sub-images and the second set of sub-images are also stitched in the second plane, and thereby obtaining a second stitched image. Finally the first stitched image is combined with the second stitched image and thereby creating the combined image.

In accordance with a second aspect of an embodiment, an electronic device for creating a combined image is provided. The electronic device a first obtaining unit adapted to obtain a first set of at least two sub-images recorded by an array of image recording units. A second obtaining unit is adapted to obtain a second set of at least two sub-images recorded by an array of image recording units. The electronic device comprises a first calculating unit adapted to calculate a first depth map for the first set of sub-images, the first depth map comprises information about a first plane of the sub-images and a second plane of the sub-images, the first plane being at a first distance from the point where the sub-images have been recorded, and the second plane being at a second distance from the point where the sub-images have been recorded. The electronic device further comprises a second calculating unit adapted to calculate a second depth map for the second set of sub-images; the second depth map comprises information about the first plane and the second plane. A first stitching unit is adapted to stitch the first set of sub-images and the second set of sub-images in the first plane, and thereby obtaining a first stitched image. A second stitching unit is adapted to stitch the first set of sub-images and the second set of sub-images in the second plane, and thereby obtaining a second stitched image. Finally a combining unit is adapted to combine the first stitched image with the second stitched image and thereby creating the combined image.

The embodiments solve the problems described above in that a depth map is calculated and the electronic device compensates for that the sub-images are not recorded from the exact same location.

An advantage with embodiments herein is that an improved combined image is provided.

A further advantage with embodiments herein is that less demand is put on the user to record the sub-images from the same location.

A further advantage with embodiments herein is that the foreground and the background in the combined images will line up even if the sub-images are not recorded from the same location.

BRIEF DESCRIPTION OF THE DRAWINGS

Examples of embodiments herein are described in more detail with reference to attached drawings in which.

DETAILED DESCRIPTION

Embodiments will be exemplified in a non-limiting description.

Figure 1:
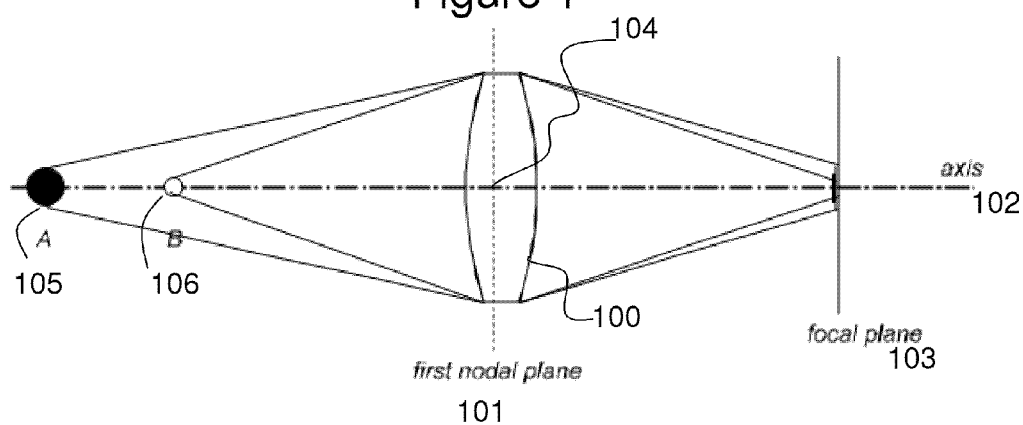
FIG. 1 is a schematic block diagram illustrating a lens comprised in a camera according to prior art.
Figure 2:
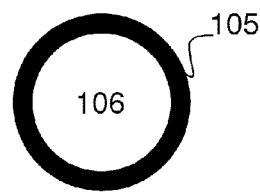
FIG. 2 is an illustration relating to FIG. 1.
Figure 3:
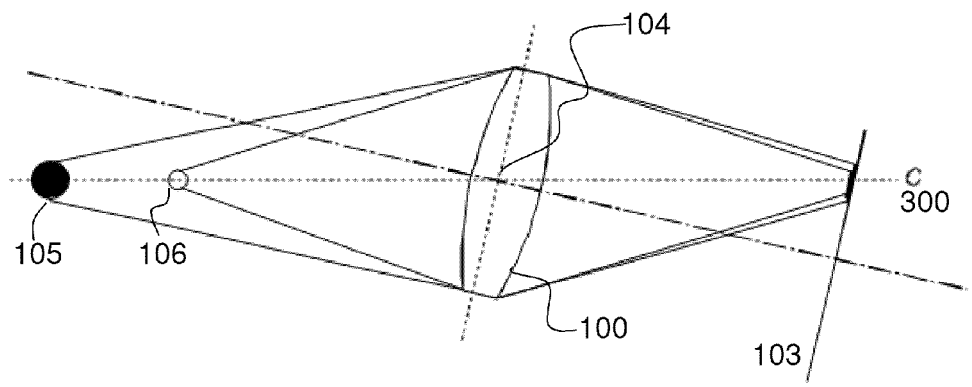
FIG. 3 is a schematic block diagram illustrating a lens comprised in a camera according to prior art.
Figure 4:
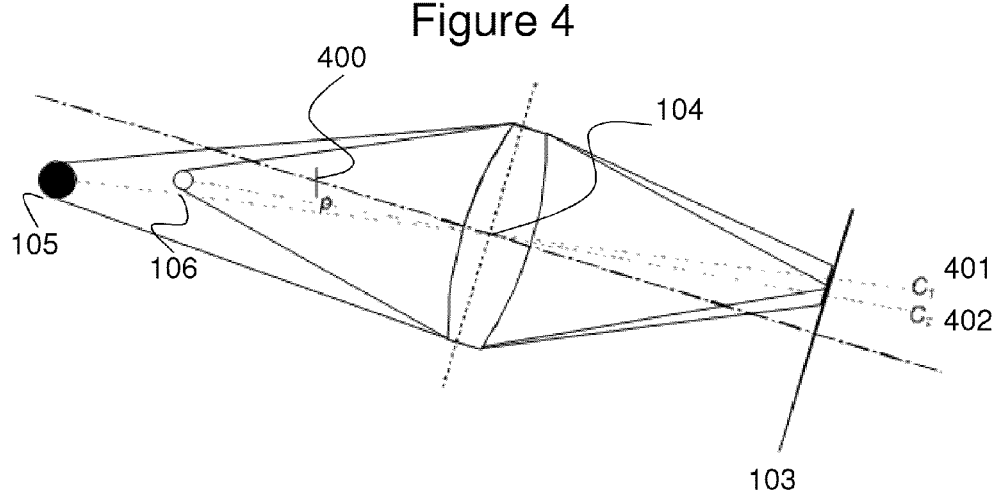
FIG. 4 is a schematic block diagram illustrating a problem with the prior art.
Figure 5:
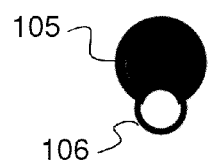
FIG. 5 is an illustration relating to FIG. 4.
Figure 6:
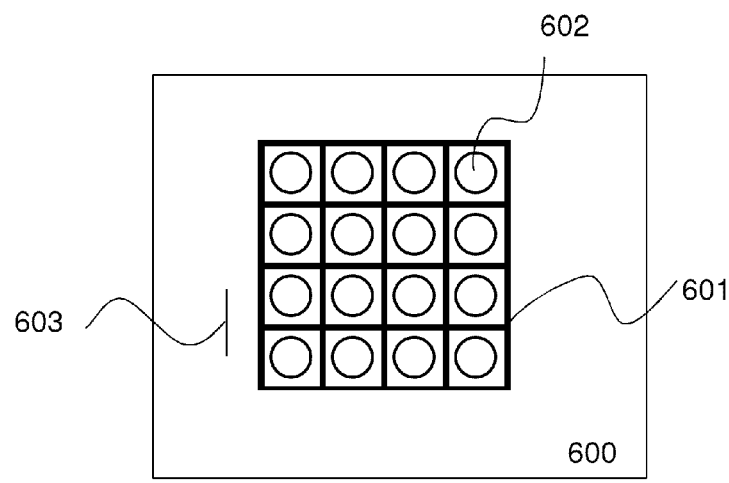
FIG. 6 is an illustration of an electronic device according to embodiments herein.

To create a combined image such as panoramic or three dimensional least two sub-images is recorded with some physical separation. These sub-images may be recorded with one camera that has been moved slightly to the side between the recordings. The combined image may also be recorded with an array camera. An array camera consists of a plurality of sub-cameras. FIG. 6 illustrates a simplified drawing of an electronic device 600, comprising an array camera 601 consisting of 16 sub-cameras 602. It should be noted that an array camera 601 may have any number of sub cameras (two or more). It is assumed that a distance 603 between the sub-cameras 602 or points where the sub-images are recorded is usually much less (less than ten times) than a distance between the sub-camera and an illustrated object in the sub-image. The electronic device 600, 800 may be e.g. a camera, mobile phone, a tablet computer, or any kind of computer.

A problem when correcting for internal parallax between two images, e.g. the two sub-images, is the occlusion of object or objects. It is not known what is behind an object so when the parallax is corrected by moving objects, spots of unknown content appears. The 16 sub-images created by the array camera will show different amount of internal parallax. Those sub-images will contain a lot of redundant information as opposed to a set of just two images. The internal parallax of the 16 sub-images holds a rich set of information.

If none of the sub-cameras is rotated around or closely around the first principal point we still are better off than with a single lens camera. The internal parallax between the sub-cameras may be used to detect what areas of the combined image that are affected by the misalignment as well as the amount of error. This information may then be used to correct for the problem of occlusion of object or objects by moving the contents of affected areas of the combined image until registration is achieved. Such an action result in occlusion effects (we cannot see behind objects) when using a single lens camera. The array camera on the other hand produces a set of sub-images where internal parallax minimizes or eliminates occlusions. Hence, it is possible to detect, measure, and correct for internal parallax caused by misalignment between the first nodal point and the actual rotation center of the camera.

Figure 9:
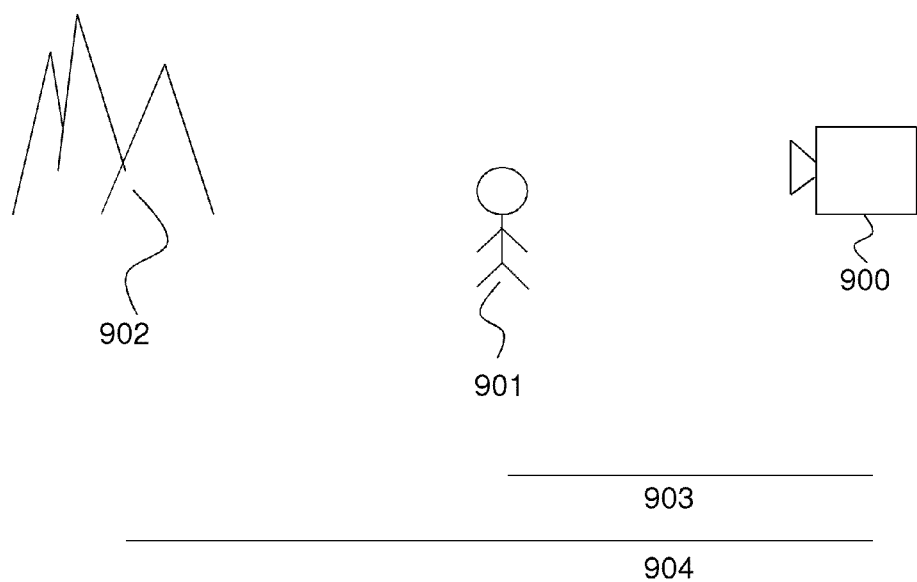
FIG. 9 is an illustration of a camera and its illustrated objects.

FIG. 9 schematically illustrates a camera 900 and its illustrated objects. The camera is recording a first object 901 and a second object 902. The first object 901 and its adjacent objects (not shown) are placed in a first plane. The first plane is placed at a first distance 903 from the camera 900. The second object 902 and its adjacent objects (not shown) are placed in a second plane. The second plane is placed at a second distance 904 from the camera 900. The first plane being different from the second plane.

Figure 7:
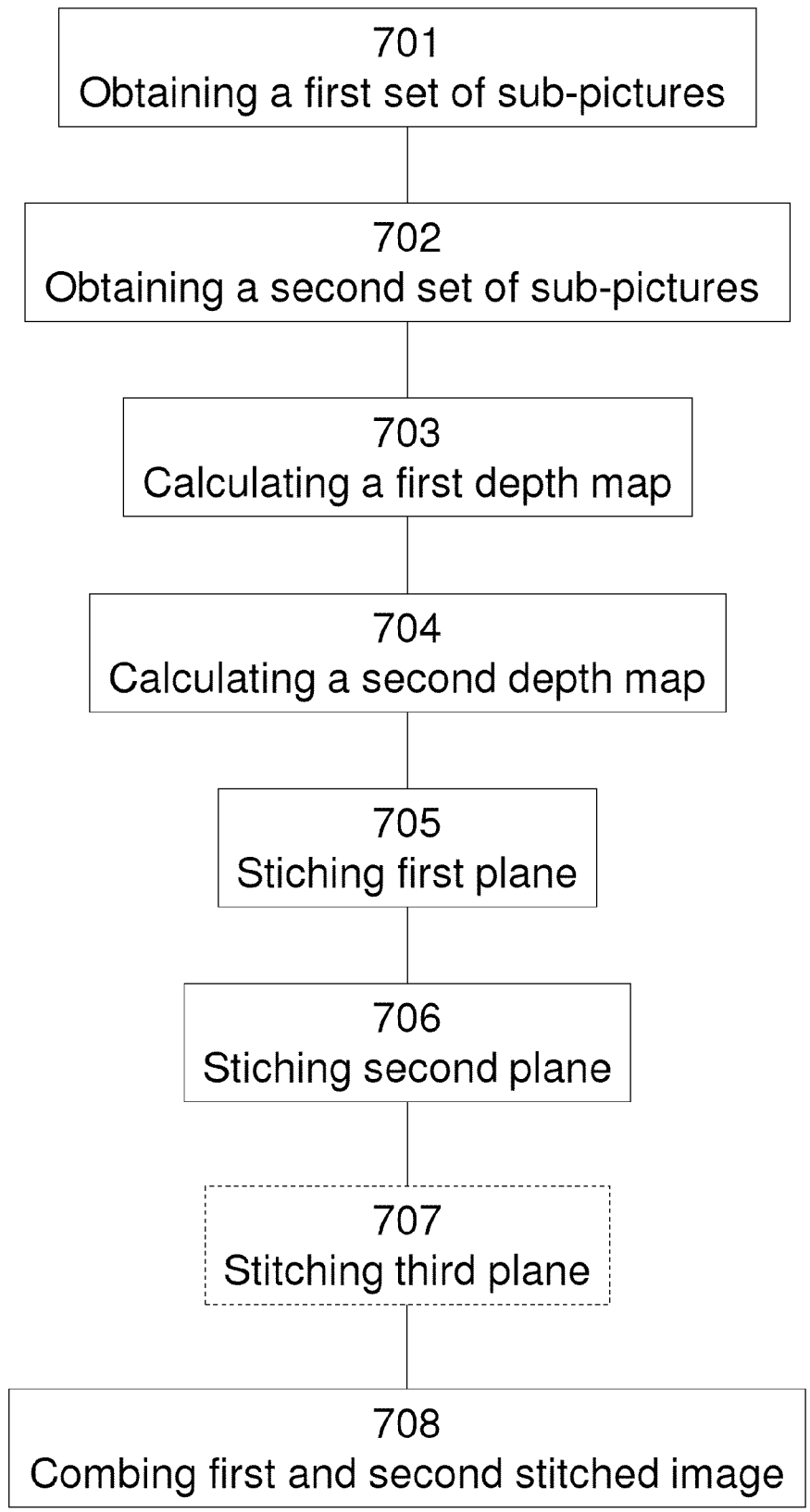
FIG. 7 is a flowchart depicting embodiments of a method in an electronic device.

Embodiments of a method in an electronic device for creating a combined image will now be described with reference to the flowchart depicted in FIG. 7. A combined image may e.g. be a panorama image or a three dimensional image. The method comprises the following actions, which actions may be carried out in another suitable order than described below.

Action 701

A first set of at least two sub-images is obtained. The first set of sub-images is recorded by an array of image recording units e.g. an array camera comprised in an electronic device 800.

The array camera may comprise at least two sub-cameras adapted to produce, each, one sub-image out of the at least two sub-images. The at least two sub-cameras may in this case be mounted adjacent one another as illustrated in relation to FIG. 6. The at least two sub-cameras may, alternatively, be mounted on different locations within the electronic device 800. If the electronic device 800 for example is a mobile phone, both sub-cameras may be placed on the back of the mobile phone, but one camera may be placed on the top and one on the bottom. When recording the set of at least two sub-images the at least two sub-cameras recording the sub-images are directed in essentially the same direction, but with some separation in space. Ideally the at least two sub-cameras should be directed in the same direction but a couple of degrees difference is OK. It is obvious for the person skilled in the art how much separation between the sub-cameras that is preferred.

The array camera may also comprise at least two sub-images taken by one camera at least at two different locations. In this case the two sub-images are recorded with the same camera but the camera is moved slightly between the recordings. It is obvious for the person skilled in the art how much the camera should be moved.

Action 702

A second set of at least two sub-images recorded by the array of image recording units. The recording of the at least two sub-images may be done in the same way as described in relation to action 701.

The first set of sub-images and the second set of sub-images are recorded with the array cameras directed in different directions, but it is preferred that there is some overlap between the first set of sub-images and the second set of sub-images.

Action 703

A first depth map is calculated for the first set of sub-images. The first depth map comprises information about the distance between the illustrated objects in the sub-images and the point where the sub-images have been recorded. The first depth map may be created with any method known in the prior art. The first depth map comprises information about a first plane of the sub-images and a second plane of the sub-images. The first plane being at a first distance from the point where the sub-images have been recorded, and the second plane being at a second distance from the point where the sub-images have been recorded. These two planes may e.g. represent a foreground and a background in the image. The at two planes may be defined using information in the depth map.

The distance between the first plane to the point where the sub-images have been recorded may be larger than the distance between the second plane and the point where the sub-images have been recorded.

Action 704

A second depth map is calculated for the second set of sub-images. The second depth map comprises information about the first plane and the second plane. The second depth map may be created in the same way as the first depth map. This calculation may be performed in the same way as described in action 703.

Action 705

The first set of sub-images and the second set of sub-images are stitched in the first plane, and thereby obtaining a first stitched image. In the prior art there are many different techniques for stitching two images.

As described in the background, objects in a more distant plane may be hidden by objects in the foreground. Information in the first stitched image may be recreated using information from the first set of sub-images and second set of sub-images, the information in the first plane being hidden by objects in the second plane by one of the first set of sub-images and the second set of sub-images. Information in a more distant plane may be hidden in some sub-images but not in others. Information from several sub-images are used when recreating information in the more distant plane.

Action 706

The first set of sub-images and the second set of sub-images are stitched in the second plane, and thereby obtaining a second stitched image. This stitching may be performed in the same way as the stitching in action 705.

Action 707

The first set of sub-images and the second set of sub-images may be stitched in the third plane, and thereby obtaining a third stitched image. This stitching may be performed in the same way as the stitching in action 705.

Action 708

The first stitched image is combined with the second stitched image and thereby creating the combined image. There are several known ways in the prior art of how the first stitched image may be combined with the second stitched image.

One way to combine the first stitched image with the second stitched image may be to place the second stitched image in front of the first stitched image.

Accord to another embodiment more than two planes may be defined using the depth map. The calculation of the first depth map and the second depth map may further be based on information about a third plane, the third plane being at a third distance from the point where the sub-images have been recorded. The first set of sub-images and the second set of sub-images are stitched in the third plane, and thereby obtaining a third stitched image. The first stitched image and the second stitched image is further combined with the third stitched image to produce the combined image.

The embodiments described here is not limited to that the stitching is performed in two or three planes. The calculation of the first depth map and the second depth map may further be based on information about n planes, where n is a natural number. The n planes being at n distances from the point where the sub-images have been recorded. The first set of sub-images and the second set of sub-images are stitched in the respective n planes, and thereby obtaining n stitched images. The first stitched image and the second stitched image is further combined with the n stitched images to produce the combined image.

Figure 8:
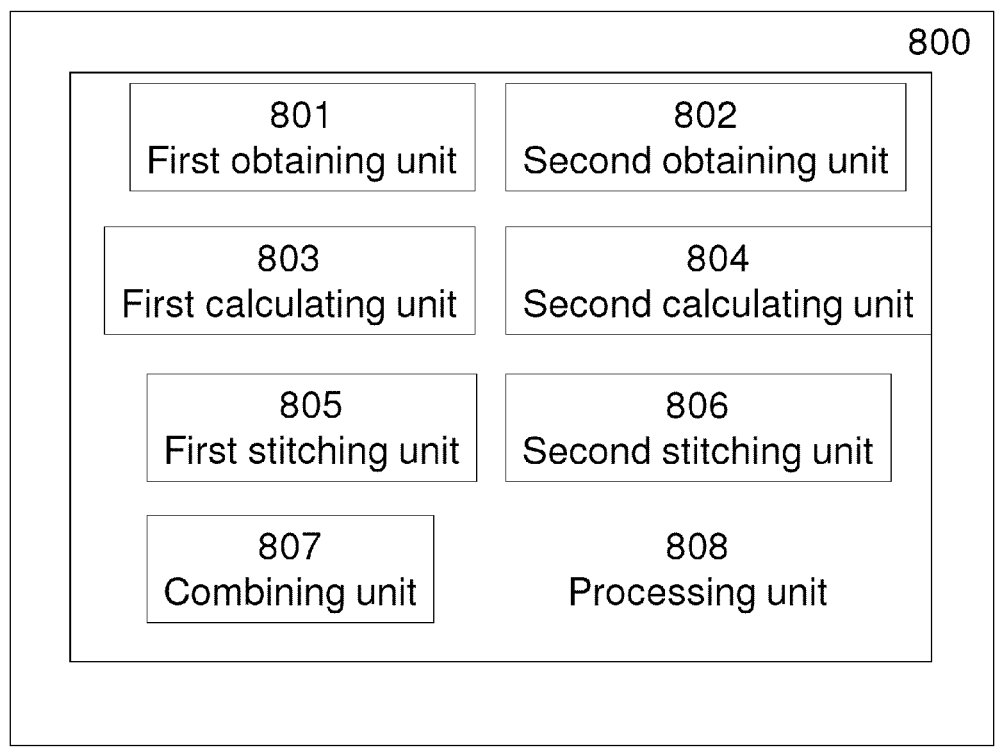
FIG. 8 illustrates embodiments of the electronic device.

An electronic device 800 according to embodiments is described herein in relation to FIG. 8. The electronic device 800 may e.g. be a camera, mobile phone, a tablet, or any kind of computer. The electronic device 800 is adapted to create a combined image. A combined image is a combination of several images, e.g. a panorama image.

The electronic device 800 comprises a first obtaining unit 801 adapted to obtain a first set of at least two sub-images recorded by an array camera. The first obtaining unit 801 may also implement all actions described in relation to action 701 above.

The electronic device 800 also comprises a second obtaining unit 802 adapted to obtain a first set of at least two sub-images recorded by an array camera. The second obtaining unit 802 may also implement all actions described in relation to action 702 above.

The electronic device 800 comprises a first calculation unit 803 adapted to calculate a first depth map for the first set of sub-images. The first depth map comprises information about a first plane of the sub-images and a second plane of the sub-images. The first plane is at a first distance from the point where the sub-images have been recorded, and the second plane is at a second distance from the point where the sub-images have been recorded. The first calculation unit 803 may also implement all actions described in relation to action 703 above.

The electronic device 800 also comprises a second calculation unit 804 adapted to calculate a second depth map for the second set of sub-images. The second depth map comprises information about the first plane and the second plane. The second calculation unit 804 may also implement all actions described in relation to action 704 above.

The electronic device 800 comprises a first stitching unit 805 adapted to stich the first set of sub-images and the second set of sub-images in the first plane, and thereby obtaining a first stitched image. The first stitching unit 805 may also implement all actions described in relation to action 705 above.

The electronic device 800 also comprises a second stitching unit 806 adapted to stich the first set of sub-images and the second set of sub-images in the second plane, and thereby obtaining a second stitched image. The second stitching unit 806 may also implement all actions described in relation to action 706 above.

The electronic device 800 also comprises a combining unit 807 adapted to combine the first stitched image with the second stitched image and thereby creating the combined image. The combining unit 807 may also implement all actions described in relation to action 708 above.

The embodiments herein for creating a combined image may be implemented through one or more processors, such as a processing circuit 808 in the electronic device 800 depicted in FIG. 8, together with computer program code for performing the functions and/or method steps of the embodiments herein. The program code mentioned may also be provided as a computer program product, for instance in the form of a data carrier carrying computer program code for performing embodiments herein when being loaded into the electronic device 800. One such carrier may be in the form of a CD ROM disc. It is however feasible with other data carriers such as a memory stick. The computer program code may furthermore be provided as pure program code on a server and downloaded to the electronic device 800.

Those skilled in the art will also appreciate that the first obtaining unit 801, the second obtaining unit 802, the first calculating unit 803, the second calculating unit 804, the first stitching unit 805, the second stitching unit 806 and the combining unit 807 described above may refer to a combination of analog and digital circuits, and/or one or more processors configured with software and/or firmware, e.g. stored in a memory, that when executed by the one or more processors. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A computer program product is loadable into a memory of a computer and comprising software code portions adapted for realizing one or more of the features of the electronic device 800 and/or performing one or more actions of the method described above when being executed in the electronic device 800.

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the embodiments should not be taken as limiting the scope of the invention, which is defined by the appending claims.

The invention claimed is:

1. A method in an electronic device for creating a combined image, the method comprising:
   obtaining a first set of at least two sub-images recorded by an array of image recording units;
   obtaining a second set of at least two sub-images recorded by the array of image recording units;
   calculating a first depth map for the first set of sub-images, the first depth map comprises information about a first plane of the sub-images and a second plane of the sub-images, the first plane being at a first distance from the point where the sub-images have been recorded, and the second plane being at a second distance from the point where the sub-images have been recorded:
   calculating a second depth map for the second set of sub-images, wherein the second depth map comprising information about the first plane and the second plane;
   stitching the first set of sub-images and the second set of sub-images in the first plane, to obtain a first stitched image;
   stitching the first set of sub-images and the second set of sub-images in the second plane to obtain a second stitched image; and
   combining the first stitched image with the second stitched image to create the combined image.

2. The method according to claim 1 wherein the distance between the first plane to the point where the sub-images have been recorded is larger than the distance between the second plane and the point where the sub-images have been recorded.

3. The method according to claim 2 wherein combining the first stitched image with the second stitched image comprises placing the second stitched image in front of the first stitched image.

4. The method according to claim 1 wherein the calculating of the first depth map and the second depth map further is based on information about a third plane, the third plane being at a third distance from the point where the sub-images have been recorded, the method further comprising:
   stitching the first set of sub-images and the second set of sub-images in the third plane, to obtain a third stitched image, and wherein the combining of the first stitched image and the second stitched image further comprises combining the first stitched image and the second stitched image with the third stitched image.

5. The method according to claim 1 wherein calculating the first depth map and the second depth map further is based on information about n planes, where n is a natural number, the n planes being at n different distances from the point where the sub-images have been recorded,
   wherein stitching the first set of sub-images and the second set of sub-images comprises stitching in the respective n planes, to obtain n stitched images, and wherein the combining comprises:
   combining the first stitched image and the second stitched image with the n stitched images.

6. The method according to claim 1 wherein the array of image recording units comprises at least two sub-cameras adapted to produce one sub-image each.

7. The method according to claim 1 wherein the array of image recording units comprises at least two sub-images taken by a single camera at least at two different locations.

8. The method according to claim 1, wherein combining further comprises recreating information in the first stitched image using information from the first set of sub-images and second set of sub-images, the information in the first plane being hidden by objects in the second plane by one of the first set of sub-images and the second set of sub-images.

9. A non-transitory computer-readable memory device comprising one or more instructions for performing one or more actions of claim 1 when being executed.

10. An electronic device for creating a combined image, comprising:
    a first sub-camera to obtain a first set of at least two sub-images recorded by an array of cameras,
    a second sub-camera to obtain a second set of at least two sub-images recorded by the array of cameras, and
    one or more processors to:
       calculate a first depth map for the first set of sub-images, the first depth map comprises information about a first plane of the sub-images and a second plane of the sub-images, the first plane being at a first distance from the point where the sub-images have been recorded, and the second plane being at a second distance from the point where the sub-images have been recorded,
       calculate a second depth map for the second set of sub-images, wherein the second depth map comprises information about the first plane and the second plane,
       stitch the first set of sub-images and the second set of sub-images in the first plane, to generate a first stitched image,
       stitch the first set of sub-images and the second set of sub-images in the second plane, to generate a second stitched image, and
       combine the first stitched image with the second stitched image and to create the combined image.

11. The electronic device according to claim 10, wherein the distance between the first plane to the point where the sub-images have been recorded is larger than the distance between the second plane and the point where the sub-images have been recorded.

12. The electronic device according to claim 11, wherein the one or more processors to combine the first stitched image with the second stitched image is further configured to place the second stitched image in front of the first stitched image.

13. The electronic device according to claim 11, wherein the one or more processors is further configured to recreate information in the first stitched image using information from the first set of sub-images and second set of sub-images, the information in the first plane being hidden by objects in the second plane by one of the first set of sub-images and the second set of sub-images.

14. The electronic device according to claim 10, wherein the one or more processors to calculate the first depth map and the second depth map is further configured to calculate information about n planes, where n is a natural number, the n planes being at n distances from the point where the sub-images have been recorded,
   wherein the one or more processors to stitch the first set of sub-images and the second set of sub-images is further configured to stitch the respective n planes, to generate n stitched images, and
   wherein the one or more processors to combine the first stitched image and the second stitched image is further configured to combine the first stitched image and the second stitched image with the n stitched images.

15. The electronic device according to claim 10 wherein the array of cameras comprises at least two sub-cameras adapted to produce one sub-image each.

\* \* \* \* \*